United States Patent [19]

Beling et al.

[11] 4,271,384

[45] Jun. 2, 1981

[54] SYNCHRONOUS MOTOR DRIVE

[75] Inventors: Thomas E. Beling, Saxonville; Leopold Bric, Braintree, both of Mass.

[73] Assignee: Sigma Instruments, Inc, Braintree, Mass.

[21] Appl. No.: 850,201

[22] Filed: Nov. 10, 1977

[51] Int. Cl.³ .......................... H02P 5/50; G05B 19/40
[52] U.S. Cl. ................................ 318/685; 318/314; 318/318
[58] Field of Search ............................ 318/171–174, 318/190, 306, 310, 318, 329, 314, 685, 696

[56] References Cited

U.S. PATENT DOCUMENTS

| 3,331,006 | 7/1967 | Strand et al. | 318/314 |
| 3,405,259 | 10/1968 | Sano | 318/271 |
| 3,424,966 | 1/1969 | Webb | 318/314 |
| 3,569,808 | 3/1971 | Goto | 318/314 |
| 3,668,492 | 6/1972 | Konishi et al. | 318/314 |
| 4,002,962 | 1/1977 | Miller | 318/329 |

Primary Examiner—Gene Z. Rubinson
Attorney, Agent, or Firm—Toren, McGeady and Stanger

[57] ABSTRACT

A synchronous motor is driven by applying cyclical or digital data through a phase locked loop whose loop filter integrates with a time constant equal to or greater than the inertial delay of the motor from start to its operating speed. According to one embodiment, the frequency output of the phase locked loop is further controlled with a digital rate multiplier whose phase effects are minimized by operating the VCO at a multiple of the input frequency and feeding the VCO voltage back through a frequency divider. According to another embodiment, the frequency control is obtained with a preliminary phase locked loop with a normal filter but a high frequency VCO whose feedback is divided by a value n, and then dividing the output of the main loop by m. Suitable counters may be used to stop and start the drive.

21 Claims, 15 Drawing Figures

COUNTER MAX.>Pi, TIME FOR Pi = FILTER RISE TIME 4,271,384

SYNCHRONOUS MOTOR DRIVE

BACKGROUND OF THE INVENTION

This invention relates to synchronous motor drives, and particularly to drives for controlling a motor that guides the laying of windings on a coil winding mechanism.

A coil winding arrangement requires a transversely moving guide to move the wire transversely as it is wound upon a rotating coil form. Synchronism between the rotation of the coil and the movement of the guide may be maintained by mechanical linkages. However, these are often cumbersome. On the other hand, utilizing a separate motor for controlling the guide is rather difficult. The guide motor must be operated in synchronism with the motor that rotates the coil form. Such synchronism is not easily obtained without complicated equipment because the guide motor must be able to stop and start with the operation of the form rotating motor. Any delay may result in the wires being improperly laid.

Stepping motors are particularly useful for performing controlled functions of the type necessary in such coil winding machines. This is so because stepping motors respond to input pulses which can be accurately counted. These pulses move the motor over accurate angular distances. However, stepping motors still have inertial delays. When such motors are stopped, pulses applied too rapidly fail to move the motor at all. Such pulses are then lost, to the detriment of the desired accuracy.

An object of the present invention is to overcome these difficulties.

Another object of the invention is to provide a drive for stepping motors.

SUMMARY OF THE INVENTION

According to a feature of the invention, these objects are attained in whole or in part by applying energizing cycles to a motor through a phase locked loop whose filter integrates the input voltage and exhibits a time factor equal to or greater than the inertial delay of the loaded motor being driven. The term time factor as used herein refers to the time needed for an output of an integrating filter to reach 95% of its maximum value. For a simple integrating filter, the time factor is the time needed for the voltage across the filter capacitor to reach 95% of the maximum voltage it would reach if left on indefinitely in response to a step function. Since such a filter capacitor charges asymptotically, one time factor equals several time constants.

These and other features of the invention will be pointed out in the claims. Other objects and advantages of the invention will become evident from the following detailed description when read in light of the accompanying drawings.

DESCRIPTION OF PREFERRED EMBODIMENTS

Figure 1:
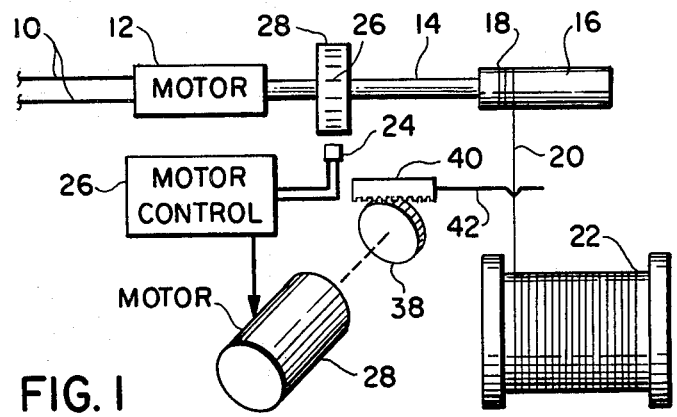
FIG. 1 is a partly schematic and partly perspective view of a coil winding system embodying features of the invention.

In FIG. 1, suitable lines 10 energize a stepping motor 12 whose shaft 14 turns a coil form 16 to lay windings 18 of wire 20 from a spool 22 upon the form. An optical sensor 24 senses the passage of magnetic or optical markings 26 on a drum 28 that rotates with the shaft 14. A motor control 26 responds to the output of the sensor 24 and drives a second stepping motor 28 so that that the latter turns a gear 38 in engagement with a rack 40. The latter translatorily moves a laying guide 42 that controls the lay of the coil windings 18.

The motor control 26 is such as to drive the motor 28 at at speed which places the windings at predetermined positions and spacings. For this purpose the motor control not only adjusts the ratio of the speeds of motors 12 and 28 to a proper value but varies the speed to accommodate the inertia of the motor 28 as it starts and stops in response to movement of the motor 12.

Figure 2:
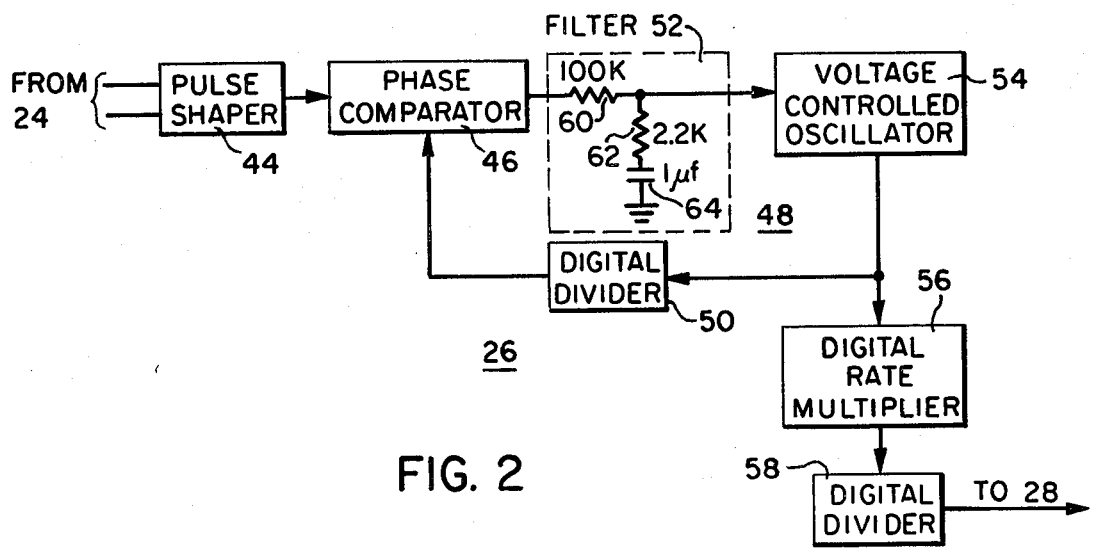
FIG. 2 is a partially schematic block diagram of a motor control in FIG. 1 embodying features of the invention.

An example of the motor control 26 appears in FIG. 2. Here a pulse shaper 44 applies pulses from the sensor 24 to a phase comparator 46 that forms part of a phase locked loop 48. The phase comparator 46 compares the phase of signals from a digital divider 50 with the input from the pulse shaper 44 to produce a voltage corresponding to or proportional to the phase between the two input signals thereto. An integrating filter 52 filters the output of the phase comparator 46 and applies it to a voltage controlled oscillator 54 whose frequency is proportional or corresponds to the voltage applied thereto. According to one embodiment of the invention, the voltage controlled oscillator oscillates over a varying frequency range which, during the steady state rotation of the shaft 14, is equal to 100 times the pulse shaper frequency 44. Thus when the input frequency to the pulse shaper 44 is 600 Hz., the output frequency of the oscillator 54 is 60 kHz.

A digital divider 50 divides the output of the voltage controlled oscillator 54 by the aforementioned multiple, 100 according to this embodiment, for application back to the phase comparator. Essentially now, the frequency of the voltage controlled oscillator 54 varies generally with the input from the pulse shaper 44.

A digital rate multiplier now multiplies the output of the VCO 54 by some predetermined value between 0 and 0.999999 which establishes the ratio between the speeds of the shaft 14 and the rotation of the gear 38. This ratio is established by the desired pitch of the windings 18 on the basis of the diameter of the form 16. A digital divider 58 divides the resulting signal, which includes a multiple of 100 between the pulse shaper 44 and the VCO 54, by 100 and applies it to the motor 28. Hence, the frequency of the output to the stepping motor 28 represents a ratio of the frequency from the pulse shaper 44 determined by the multiplier 56.

In operation, the control 26 corresponds to that of an ordinary phase locked loop. That is, the signals from the digital divider are compared by the phase comparator 46 with the signals from the pulse shaper. The greater the phase difference, the greater is the voltage output from the comparator 46, and hence the voltage output of the filter 52. This increases the frequency of the voltage controlled oscillator, so that the output of the digital divider 50 produces less of a phase difference between itself and the output of the pulse shaper. This keeps the output of the voltage controlled oscillator 54, and hence the digital divider 58, in synchronism or step with the input from the pulse shaper.

In contrast with ordinary phase locked loops, where the filter merely removes components other than the phase difference from the output of the phase comparator 46, the filter 52 is composed of an integrator having two resistors 60 and 62 as well as a capacitor 64. These components are selected to have a time factor of approximately 0.1 seconds which corresponds to the time it takes for the motor 28 to reach its operating speed from standstill as a result of its loaded inertia. The loaded inertia includes the internal inertia of the motor as well as the inertia of any load. As stated, the "time factor" is the time it takes for the filter output to reach 95% of its maximum value in response to a stop function. By virtue of this filter, the frequency of the oscillator 54 and the divider 58 does not keep step with the pulse shaper 44 frequency at the start of any group of pulses from the pulse shaper 44. Rather, when the pulse shaper frequency is 600 Hz. the first 60 pulses or so to the phase comparator do not cause an immediate rise in the frequency of oscillator 54 and hence the digital divider 58. The frequency to the motor 28 rises slowly so that the inertia of the loaded motor can respond to more widely spaced pulses until it has a chance to overcome its starting inertia. This avoids the effect of rapidly rising pulses that might fail to produce steps and hence be lost. Once the motor 28 has overcome its initial inertia after the first 600 pulses or so, the phase comparator reduces the phase difference between its two inputs and allows the motor 28 to move the wire 20 at the appropriate speed. On the other hand, because the initial pulses have been applied to the motor 28 at a sufficiently slow rate, the motor responds to each of the pulses so that each coil winding 18 is moved the desired distance, although at a slower rate at the outset.

Figure 3:
FIGS. 3, 4, and 5, are graphs illustrating waveforms of portions of the circuit in FIG. 2.
Figure 4:
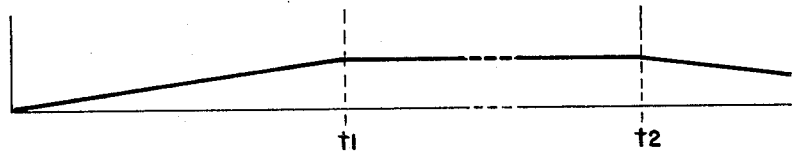
Figure 5:
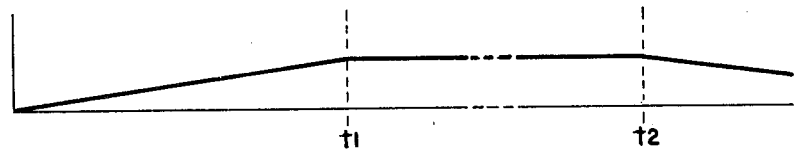

FIG. 3 illustrates a burst of pulses at the output of the shaper 44. FIG. 4 illustrates the effect of such pulses in FIG. 3 at the output of the phase comparator 46. FIG. 5 illustrates the frequency output of the divider 50 resulting from the burst of pulses in FIG. 3. The slow rise time and drop time of the voltage and frequency in FIGS. 4 and 5 results from the approximately 0.1 second time constant of the filter 52. By conforming this rise and drop time to the inertia of the loaded motor 28, the latter is not burdened with pulses it is unable to handle.

Figure 6:
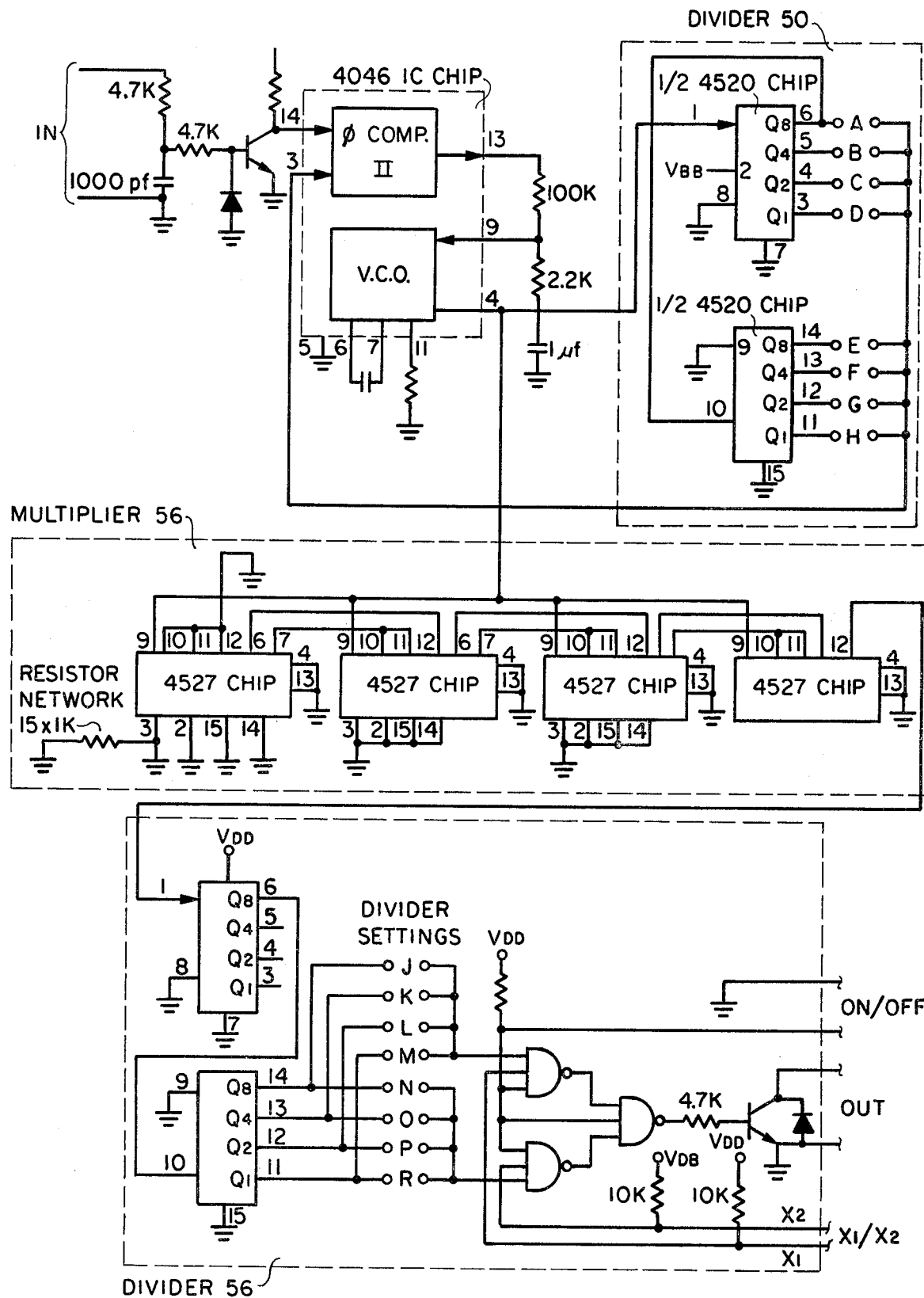
FIG. 6 is a more detailed diagram of the circuit in FIG. 2.

FIG. 6 is a more detailed schematic diagram of the circuit in FIG. 2. This diagram shows the particular circuit chips and pin connections which are used within the particular members of FIG. 2. The digital rate multiplier produces its ratio output of 0 to 0.9999 by cancelling selected ones of the pulses emerging from the oscillator 54. This varies the time rates between adjacent pulses in the time slots of the cancelled pulses. However, the frequency output of the voltage controlled oscillator 54 is one hundred times that of the operating frequency. Thus when the digital divider 58 divides the result by one hundred, it compensates for the variation in individual pulse spacing. The high division by the divider 58 smoothes the output of the digital rate multiplier 56 sufficiently to allow satisfactory stepping motor operation.

According to the invention, any or all of the digital divider 50, a multiplier 56, or divider 58 are variable so that the motor control 26 effectively provides a variable gear ratio driver without mechanical connections.

According to another embodiment of the invention, the control 26, instead of responding to a sensor such as 24, responds to a clock input for controlling a motor.

According to the invention, the phase locked loop must respond only to the fundamental frequency. For this purpose, the loop utilizes a phase detector or phase comparator described as phase comparator II in the RCA Manual of Data Devices, published by the Radio Corporation of America, in 1975, the portion entitled "CD 4046A Types COS/MOS Micropower Phase Locked Loop". A characteristic of such phase comparators is that no phase difference exists between signal and comparator input over the full VCO frequency range. Such a phase detector is also described in the book "Phase Locked Loops" by Alain Blanchard, published by John Wiley & Sons of New York, etc., 1976, Chapter 2, page 28, Section 2.1.6. Loops with such phase detectors lock only on the fundamental frequency and not on any harmonics thereof.

Other types of phase detectors may be used together with filters that exclude harmonics. An example of a phase comparator for use in such a loop is the comparator described in the aforementioned RCA publication as Phase Comparator I with Harmonic-Excluding Filters.

The actual time constants of the filter 22 need only be equal to or greater than the inertial time, i.e, the time it takes for the motor to reach its operating speed from standstill, as a result of its loaded inertia, i.e., the internal inertia of the motor and that of the load. The actual values of filter 22 may vary. If the time constant is very high, the only effect will be that the motor runs more slowly than it can. Preferably the time constant is kept to three times the inertial time or less. Most preferably from 1 to 1.5 times the inertial time.

As used herein time constant of the filter 22 refers to the time it takes the filter capacitor to charge to 90% of its value.

Figure 7:
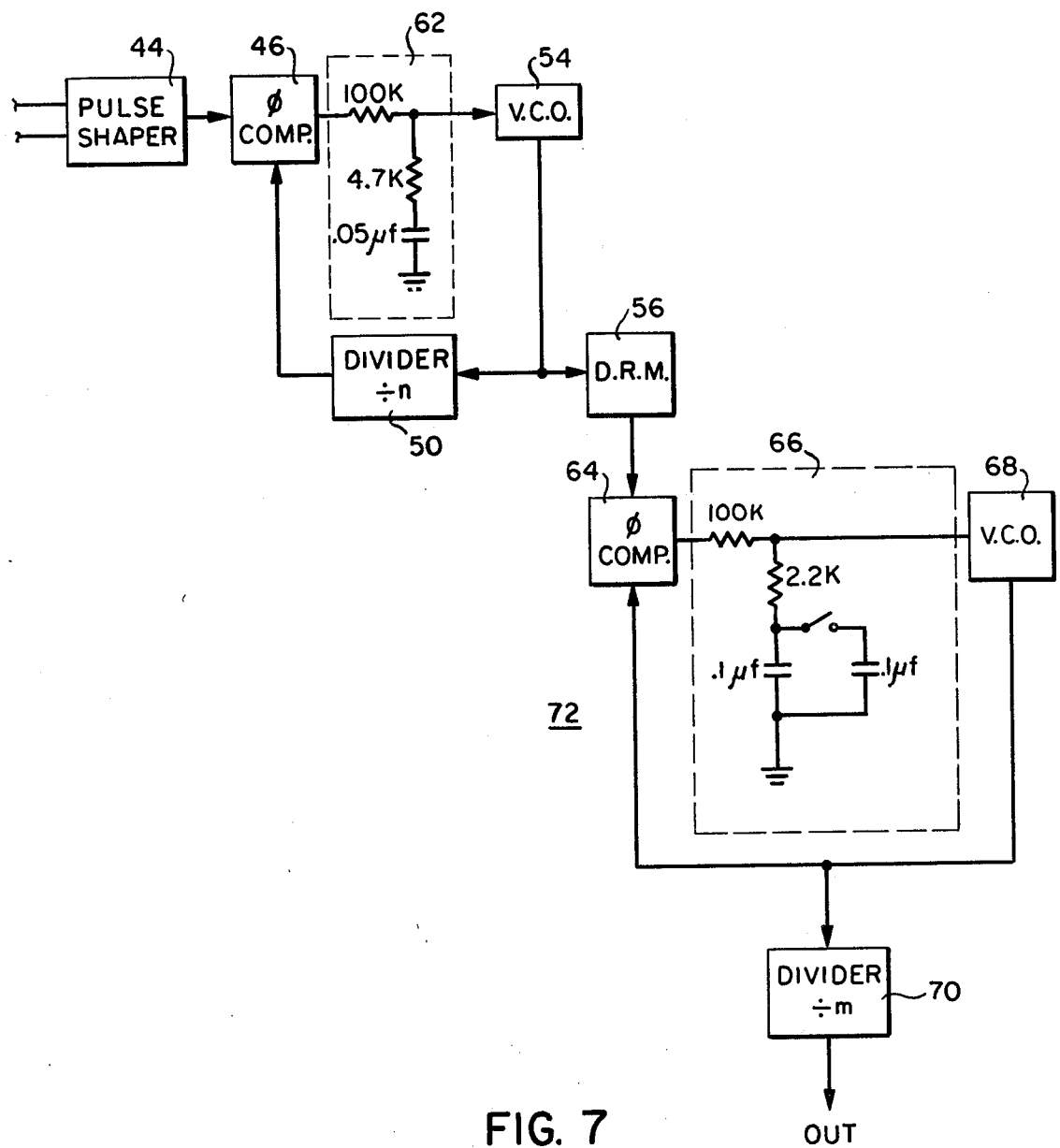
FIG. 7 is a block diagram of another circuit embodying features of the invention for use as a motor control in FIG. 1.

Another embodiment of the motor control 26, either responding to the sensor 24, or to a clock input is shown in FIG. 7. Here, the like numerals represent like parts to those shown in FIG. 2. A pulse shaper 44 applies input pulses to a phase comparator 46. A filter 62 having an approximately 5 milisecond rise time filters the high frequency components and applies the signal to a voltage controlled oscillator 54. The voltage controlled oscillator may for example have a frequency 100 to 1,000 times as great as the frequency to the pulse sharper 44. A divider 50 divides the frequency by n back to the pulse shaper frequency and applies its output to the second input of the phase comparator 46. In the usual operation of the phase locked loop, the output frequency of the voltage controlled oscillator varies with the input frequency.

The digital rate multiplier 56 varies the output rate from 0 to 0.9999 of the oscillator 54 frequency and applies it to a second phase locked loop composed of a phase comparator 64, a filter 66, a VCO 68, and a divider 70. The filter 66 is composed of an integrating circuit similar to the filter 52 and has a rise time corresponding to the time it takes for the motor 28 to reach its operating speed from standstill as a result of its mechanical inertia. This second phase locked loop designated 72 corresponds in operation to the phase locked loop 48. The divider 70 divides the output of the voltage controlled oscillator by a value m.

Appropriate selection of the values m and n allows the division controls on the digital rate multipler to be calibrated directly in revolutions per minute or other desired units. The second phase-locked loop permits changes in speed during operation as the filter limits output acceleration. It prevents changes in division at the digital rate multiplier 56 from affecting the frequency too rapidly.

Figure 8:
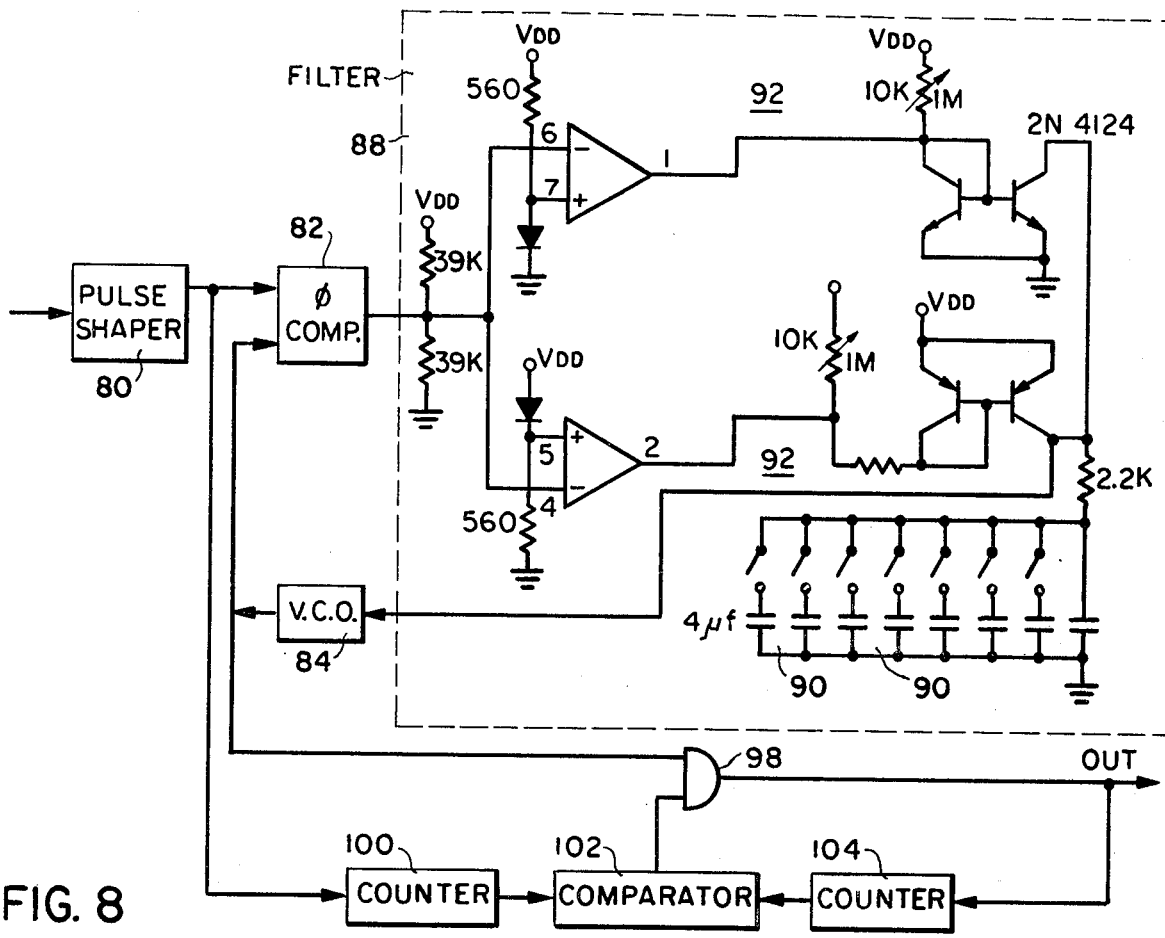
FIG. 8 is a partially schematic block diagram of another circuit embodying features of the invention for use as a motor control in the arrangement of FIG. 1.

Another embodiment of the motor control 26 appears in FIG. 8. Here, a pulse shaper 80 and a phase comparator 82, correspond in structure and function to the respective pulse shaper 44 and phase comparator 46 of FIGS. 2 and 7. A voltage controlled oscillator 84 corresponds to the VCO 54 but generates a pulse frequency at or near the frequency of the pulse shaper rather than at a higher multiple thereof. An integrating filter 88 forms a linear ramp generator whose slope is varied by switching in one or more of a number of parallel for microfarad capacitors 90. The filter or ramp linearity is established by two constant current sources 92.

Figure 9:
FIGS. 9, 10, and 11 are graphs illustrating waveforms and various portions of the circuit in FIG. 8.
Figure 10:
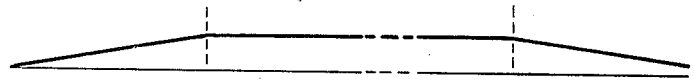

Together the components 82, 84, and 88, form and operate as a phase locked loop. The pulse generator 80 receives the input waveform and shapes it into pulses as shown in FIG. 9. The phase comparator 82 compares the phase of the pulses at the shaper with those of the VCO 84 and applies it to the filter 88 which produces a signal corresponding to that shown in FIG. 10. The voltage controlled oscillator 84 generates output pulses at a rate which varies on the basis of its input voltage and feeds the pulses back to the phase comparator 82.

Similar to the arrangement in FIG. 2, the filter 88 slows the rate at which the output of the VCO 84 is locked to the input pulses from the pulse shaper 80. The filter is switched to a time constant which allows the output voltage substantially to reach its peak, i.e., its voltage for locking the system to the nominal input frequency, in a time period corresponding to the inertial delay of the motor 28, for example, 0.1 seconds. The inertial delay constitutes the time for the loaded motor to reach its operating speed from standstill. The filter 88 also slows the rate at which the output stops in response to cessation of input pulses at pulse shaper 80.

Furthermore, the filter 88 linearizes the change in voltage output so that the filter voltage follows a ramp both at the start and cessation of input pulses. Therefore, the frequency output of the VCO 84 rises and drops linearly at the start and end of each set of pulses.

Figure 11:
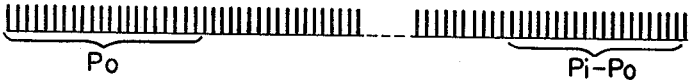

The output of the VCO 84 is applied to an AND gate 98. From the very start of any group of pulses from the pulse shaper 80, a counter 100 counts the input pulses and a comparator 102 responds by turning on the AND gate 98 as long as the comparator does not read zero. The comparator reads zero only when the inputs thereto are equal. A counter 104 applies a second input to the comparator 102 in response to the output from the gate 98. The capacity of the counters 102 and 104 are equal to each other and greater than the number of input pulses Pi occurring during the rise time of the filter 88. The number of output pulses occurring during this period is identified Po. For clarity, in FIGS. 9 and 11, the number of pulses Pi and Po shown is less than that which actually occurred during the rise time.

Initially, the counter 100 starts counting and produces a non-zero output at the comparator 102. This turns on the gate 98. The phase locked loop composed of the members 82, 88, and 94, attempts to produce output pulses at the frequency of the input pulses. However, the filter 88 prevents the loop from locking it into the input frequency during the initial rise time. The loop produces pulses at a lower rate. The counter 104 now counts the output pulses but lags the counter 100. Thus, the gate 98 remains open.

At the end of the intial rise time, counter 100 has counter Pi pulses and counter 104 Po pulses. Since the numbers of these pulses is equal, the gate 98 continues to remain open. Once the loop output has locked into the loop input frequency, the inner quality still remains. The counters 100 and 104 may continuously recycle, but because of the continued inequality, the inputs to the comparator remain unequal and open the gate 98.

At the end of the total cycle of input pulses, counter 100 stops counting and enters a final count in the comparator 102. However, because of the delay of the integrating filter 88, the loop continues to producee output pulse at the VCO 84. Thus, the counter 104 keeps counting. Output pulses continue until the count in counter 104 equals the count in counter 100. This occurs after the last input pulse when the number of output pulses is Pi−Po. Therefore, the total output pulses are equal to the total input pulses. In this regard it has been assumed that when the loop is locked to the input frequency, i.e., between the initial rise time and the drop at the end, the number of pulses at the input and output are equal.

This ramper circuit therefore assures that for any given number of input pulses, the number of output pulses are exactly equal. When this embodiment of the circuit 26 is used in FIG. 1, it assures a rigid relationship in the angular travel between the motor 12 and the motor 28. This results in a rigid relationship between the angular travel of the form 16 and the translatory extent of the windings 18. Hence, the ramper circuit of FIG. 8 controls not only the angular speed but the angular distances as well.

According to another embodiment of the invention, it is possible to preset a predetermined distance which the motor 28 travels, and hence a predetermined distance along which the guide 42 places windings 18 of wire 20 upon the form 16. This is done in FIG. 12 by entering the preset distance into two counters 110 and 112. Each counter is capable of counting a number greater than the number of input pulses representing the distance to be traveled. This embodiment is particularly suitable for setting machine tools.

Figure 12:
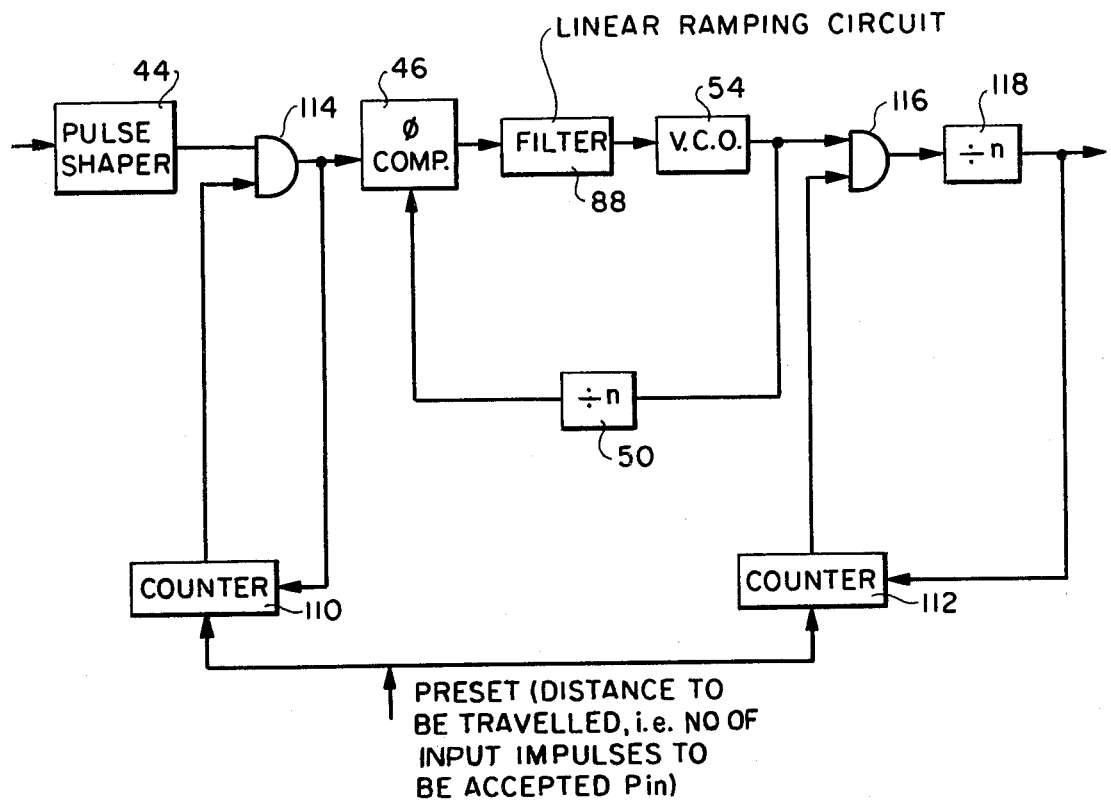
FIG. 12 is a block diagram of still another motor control of FIG. 1 embodying features of the invention.
Figure 13:
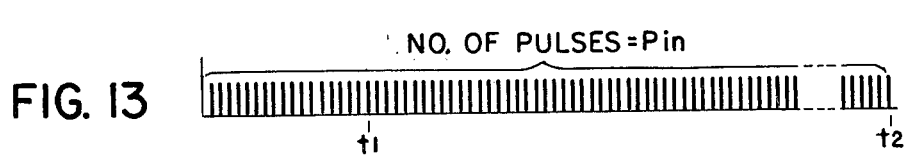
FIGS. 13, 14, and 15 are graphs illustrating waveforms in the circuit of FIG. 12.

In FIG. 12, the pulse shaper 44, phase detector 46, VCO 54, and divider 50 correspond to the like components in FIG. 7. The filter 88 corresponds to the filter 88 of FIG. 8. Therefore, the phase locked loop of FIG. 12, composed of elements 46, 88, 54, and 50, operates in the same manner as the phase locked loop of FIG. 7, except that the integrating filter 88 is in the form of a linear ramping circuit and delays the lock-in of the loop at a linear rate as in FIG. 8.

Figure 15:

The pulse shaper 44 applies the input pulses to the phase detector through an AND gate 114. The AND gate is turned on by the preset entry into the counter 110 and continues to remain on until the counter reaches its preset count as it counts up, (or until it reaches zero if the counter counts down). The output of the AND gate 114 applies the pulses from the pulse shaper 44 to the counter and the phase detector 46. An AND gate 116 applies the output of the VCO 54 through a divider 118 equal to the divider 50, as long as the counter 112 has not reached its set value (or zero if it counts down). The divider 118 applies output pulses to the motor 28 and shifts the counter 112. The output pulses are shown in FIG. 15.

Figure 14:
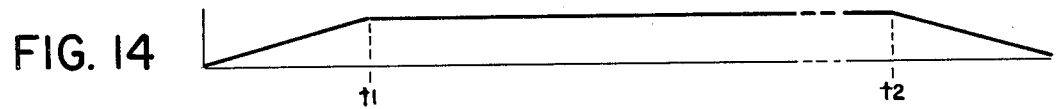

Initially, the phase locked loop fails to lock onto the input frequency because of the delaying action of the filter 88 whose output appears in FIG. 14. During this time, the counter 110 counts input pulses from the pulse shaper 44. At the same time, output pulses from the divider 118 are being counted in the counter 112. The output pulses lag the input pulses. Once the filter 88 permits the loop to lock onto the input frequency, the operation continues until the counter 110 reaches its preset value. This occurs at the time $T_2$. At this point, the AND gate blocks further input pulses from the pulse shaper 44. However, the integrating filter 88 continues to produce an output voltage which actuates the VCO 54. The output of the VCO continues to drive the divider 118 and the counter 112 until the latter reaches its preset limit. At that point the AND gate 116 is turned off and no further pulses are applied to the motor 28.

It should be noted in all of these embodiments that at the end of any input pulses to the phase detector, the integrating filter continues to store enough voltage, for a predetermined time, to actuate the VCO to produce further output pulses.

The VCO is adjusted with outside terminals to some predetermined minimum speed to ensure that the right number of pulses is read out. Thus 100% accuracy is not needed.

While embodiments of the invention have been described in detail, it will be evident to those skilled in the art that the invention may be embodied otherwise without departing from its spirit and scope.

What is claimed is:

1. For a synchronous motor capable of reaching a given speed within a predetermined time, a motor drive operable from a voltage source repetitively variable at a frequency corresponding to the given speed, comprising:
    a phase detector for responding to the source,
    a filter,
    a voltage controlled oscillator,
    feedback means,
    said phase detector, said filter, said voltage controlled oscillator, and said feedback means being connected successively to each other in a phase locked loop with said filter including integrating means having a time constant corresponding to the predetermined time.

2. A drive as in claim 1, wherein said filter has a time constant substantially equal to 0.1 seconds.

3. A drive as in claim 1, further comprising a digital rate multiplier coupled to said voltage controlled oscillator for varying the output rate of the voltage controlled oscillator.

4. A drive as in claim 1, wherein said feedback means includes a frequency divider for dividing the frequency by a predetermind value, and wherein said voltage controlled oscillator generates a frequency which is the predetermined frequency times the predetermined value when the phase locked loop is locked.

5. A drive as in claim 4, further comprising a second frequency divider coupled to the output of the voltage controlled oscillator for dividing the frequency of the voltage controlled oscillator.

6. A drive as in claim 5, wherein said second frequency divider divides the frequency by the same value as said first frequency divider.

7. A drive as in claim 6, further comprising a digital rate multiplier in cascade with said second frequency divider for multiplying the frequency by a value between zero and 0.9999.

8. A drive as in claim 1, wherein said filter includes storage means and means for leaking off the value stored in said storage means.

9. A drive as in claim 1, further comprising a second phase comparator, a second voltage controlled oscillator, a second filter, and second feedback means forming a second phase locked loop having an output at the second voltage controlled oscillator,
    coupling means coupling the output of said second phase locked loop to said first phase comparator, said second voltage controlled oscillator having a locked-in frequency which is a multiple of the predetermined frequency, said second feedback means having a frequency divider which divides the frequency by said multiple,
    said second filter having a time constant for filtering the predetermined frequency,
    said first filter having a time constant greater than said second filter, and
    a second divider coupled to the output of said first voltage controlled oscillator, said second divider and said first divider establishing an effective frequency division.

10. A drive as in claim 9, wherein said coupling means includes a frequency rate multiplier for multiplying the frequency by a proportion from zero to 0.9999.

11. A drive as in claim 10, wherein said dividers are digital and the output of said voltage controlled oscillators are digital outputs.

12. A drive as in claim 1, wherein said phase comparator responds to digital signals and said voltage controlled oscillator generates a train of pulses.

13. A drive as in claim 1, wherein said filter includes a linear ramping circuit for responding to a step function with a ramp output.

14. A drive as in claim 1, further comprising a first counter connected to the input of said phase comparator,
    a gate circuit connected to receive the output of said voltage controlled oscillator and having an output therefrom, a second counter connected to the output of said gate circuit, a comparator for comparing the outputs of said counters and connected to the gate circuit for opening the gate in response to differences between the counts of said counter,
    said counters having the same capacities, said capacities being greater than a number of cycles of the source corresponding to the predetermined time.

15. A drive as in claim 14, wherein said filter includes a linear ramping circuit for producing a linear ramp in response to a step input, said linear ramp having a time exceeding the predetermined time.

16. A drive as in claim 1, wherein said phase comparator includes an input terminal for receiving an input from the source and forming the input of said phase locked loop, said voltage controlled oscillator having an output terminal forming the output of said phase locked loop, means for counting the number of cycles at the phase locked loop input and phase locked loop output and producing an output as long as the number of cycles counted in unequal, gate means coupled to the phase locked loop output and to said means for counting and comparing for passing pulses only when the counted cycles are unequal.

17. A drive as in claim 1, further comprising input means coupled to said phase detector for counting input cycles and blocking input cycles from the source after counting a predetermined number of cycles, output means coupled to the voltage controlled oscillator for counting output cycles from the voltage controlled oscillator and blocking further output cycles when the predetermind number of cycles has been counted, said input means and said output means each including a counter settable to a number of cycles corresponding to a preset distance and having a total time greater than twice the predetermined time.

18. A drive as in claim 17, wherein said filter includes a linear ramping circuit.

19. A drive as in claim 1, wherein said phase detector, said filter, said oscillator and said feedback means are arranged so that said phase detector responds only to a fundamental frequency.

20. A coil winding mechanism for winding wire on a form, comprising motor means for driving the form, sensing means coupled to the motor means for sensing rotation of the motor means, a synchronous motor, guide means coupled to the synchronous motor for guiding wire to be wound on the form laterally along the form, a motor control coupled to the sensing means for sensing the output of the sensing means and coupled to the synchronous motor for controlling rotation of the synchronous motor, said sensing means being constructed to produce a cyclical output whose frequency varies in response to speed of said motor means; said motor control including a phase comparator connected to said sensing means, a filter, a voltage controlled oscillator, and feedback means for feeding back signals from said voltage controlled oscillator to said phase detector; said synchronous motor being capable of reaching a given speed within a predetermind time;

said phase detector, said filter, said voltage controlled oscillator, and said feedback means being connected successively to each other in a phase locked loop with said filter including integrating means having a time constant corresponding to the predetermined time.

21. A mechanism as in claim 20, wherein said detector, said filter, said oscillator, and said feedback means are arranged so that said detector responds only to a fundamental frequency.

* * * * *